(12) United States Patent
Zhao et al.

(10) Patent No.: US 12,308,441 B2
(45) Date of Patent: May 20, 2025

(54) BATTERY AND BATTERY MODULE

(71) Applicant: EVE POWER CO., LTD., Jingmen (CN)

(72) Inventors: Fenfen Zhao, Jingmen (CN); Lei Zhang, Jingmen (CN); Haixu Lu, Jingmen (CN); He Zhao, Jingmen (CN); Liming Huang, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 0 days.

(21) Appl. No.: 18/091,415

(22) Filed: Dec. 30, 2022

(65) Prior Publication Data

US 2024/0079602 A1    Mar. 7, 2024

Related U.S. Application Data

(63) Continuation of application No. PCT/CN2022/025247, filed on Oct. 14, 2022.

(30) Foreign Application Priority Data

Sep. 1, 2022 (CN) .................. 202222332225.X

(51) Int. Cl.
*H01M 4/70* (2006.01)
*H01M 50/107* (2021.01)
*H01M 50/317* (2021.01)

(52) U.S. Cl.
CPC ........... *H01M 4/70* (2013.01); *H01M 50/107* (2021.01); *H01M 50/317* (2021.01)

(58) Field of Classification Search
None
See application file for complete search history.

(56) References Cited

U.S. PATENT DOCUMENTS

| 7,318,980 B2 | 1/2008 | Kim |
| 7,485,392 B2 | 2/2009 | Kim |

(Continued)

FOREIGN PATENT DOCUMENTS

| CN | 1694279 A | 11/2005 |
| CN | 1700495 A | 11/2005 |

(Continued)

OTHER PUBLICATIONS

International Search Report issued in corresponding International application No. PCT/CN2022/125247, mailed Apr. 1, 2023.

(Continued)

*Primary Examiner* — Scott J. Chmielecki

(57) ABSTRACT

A battery and a battery module are provided. The battery includes a housing, a cell, and a current collector plate. A holding chamber is defined in the housing and a pressure relief valve is arranged on the housing; the cell is arranged in the holding chamber; the current collector plate includes a first side and a second side disposed opposite each other; the first side defines a first recess, and the first recess is spaced from the end surface of the cell; the second side defines a second recess, and the pressure relief valve is disposed directly opposite to the second recess; an edge of the current collector plate is spaced from a wall of the holding chamber to define a connection channel, and the first recess and the second recess are connected through the connection channel.

17 Claims, 2 Drawing Sheets

(56) References Cited

U.S. PATENT DOCUMENTS

| | | | |
|---|---|---|---|
| 7,955,732 B2 | 6/2011 | Kim | |
| 2010/0216001 A1* | 8/2010 | Byun | H01M 50/538 429/185 |
| 2011/0256433 A1 | 10/2011 | Fuhr | |
| 2014/0113185 A1 | 4/2014 | Mori | |
| 2020/0017237 A1 | 1/2020 | Walker | |
| 2021/0273281 A1* | 9/2021 | Yamagami | H01M 50/30 |
| 2022/0200108 A1 | 1/2022 | Kim | |

FOREIGN PATENT DOCUMENTS

| | | |
|---|---|---|
| CN | 1753214 A | 3/2006 |
| CN | 204947019 U | 1/2016 |
| CN | 212136595 U | 12/2020 |
| CN | 113678294 A | 11/2021 |
| CN | 216213727 U | 4/2022 |
| CN | 216793829 U | 6/2022 |
| CN | 217009498 U | 7/2022 |
| EP | 2380226 B1 | 3/2016 |
| EP | 3920296 A1 | 12/2021 |
| JP | 2004296341 A | 10/2004 |
| JP | 2005332816 A | 12/2005 |
| WO | 2011155198 A1 | 12/2011 |

OTHER PUBLICATIONS

Written Opinion of the International Search Authority in corresponding International application No. PCT/CN2022/125247.
JPO, Office Action for JP Application No. 2023-096701, mailed on Jul. 23, 2024 (8 pages).
European Search Report, European Application No. 22822845.8, mailed Dec. 9, 2024 (9 pages).

* cited by examiner

BATTERY AND BATTERY MODULE

CROSS REFERENCE TO RELATED APPLICATIONS

The present application is a continuation-application of International (PCT) Patent Application No. PCT/CN2022/125247, filed on Oct. 14, 2022, which claims priority of Chinese Patent Application No. 202222332225.X, filed on Sep. 1, 2022, in the China National Intellectual Property Administration, the entire contents of which are hereby incorporated by reference in their entireties.

TECHNICAL FIELD

The present disclosure relates to the field of power storage devices, and in particular to a battery and a battery module.

BACKGROUND

In cylindrical lithium-ion batteries, a current collector plate plays the role of current collection. It is found that the structure design of the current collector plate has a very strong correlation with the safety of a cell. The way the current collector plate is set up is that the whole current collector plate is tightly welded to the surface of an electrode tab of the cell. When the thermal runaway of the cell occurs, the current collector plate will be blocked in a pressure relief port with the deformation of the cell, resulting in the inability of active material and gas inside the cell to be discharged in time, thereby triggering the thermal runaway of the battery and causing fire and explosion and other safety problems.

SUMMARY OF THE DISCLOSURE

The present disclosure provides battery and a battery module with good quality and high safety factor.

In a first aspect, the present disclosure provides a battery, including:
- a housing, wherein a holding chamber is defined in the housing and a pressure relief valve is arranged on the housing;
- a cell, arranged in the holding chamber; and
- a current collector plate, including a first side and a second side disposed opposite each other; wherein the first side is connected to an end surface of the cell, and the second side is connected to a bottom of the holding chamber; the first side defines a first recess, and the first recess is spaced from the end surface of the cell; the second side defines a second recess, and the pressure relief valve is disposed directly opposite to the second recess; an edge of the current collector plate is spaced from a wall of the holding chamber to define a connection channel, and the first recess and the second recess are connected through the connection channel.

In some embodiments, the bottom of the first recess defines an immersion hole, and the immersion hole runs through the current collector plate.

In some embodiments, a cross-section of the immersion hole has the same shape as a cross-section of the first recess.

In some embodiments, the first recess includes a plurality of first recesses, the second recess includes a plurality of second recesses; the plurality of first recesses are arranged at intervals around an axis of the current collector plate, and each second recess is arranged facing an interval region between two corresponding adjacent first recesses.

In some embodiments, a central region of the first side defines a third recess, a bottom of the third recess is spaced from the end surface of the cell, and the plurality of first recesses are connected to the third recess.

In some embodiments, that each first recess has a fan ring shape; and/or
each second recess has a fan ring shape.

In some embodiments, each first recess and each second recess have the same size.

In some embodiments, the end surface of the cell near the current collector plate is flat.

In some embodiments, a distance between the bottom of the first recess and the second side is L1, a distance between a bottom of the second recess and the first side is L2, and $L1=L2$.

In a second aspect, the present disclosure provides a battery module, including the above battery.

Technical effect of the present disclosure: by setting the first recess, the connection channel, and the second recess connected, it may be ensured that the pressure relief valve is connected with the interior of the cell, such that the pressure relief valve can sense the change of air pressure in the holding chamber in time and make pressure relief in time; when the cell expands, the first recess can provide a release space for the expansion of the cell, and the gas generated inside the cell can flow into the second recess through the first recess and the connection channel and finally reach the pressure relief valve on the housing for pressure relief. The second groove can ensure that the current collector plate and the pressure relief valve are spaced apart to avoid the deformation of the current collector plate blocking the pressure relief valve, thereby avoiding fire and explosion and other safety problems caused by the untimely release of pressure inside the battery, and further ensuring the usage safety of the battery.

DETAILED DESCRIPTION

In the description of the present disclosure, unless otherwise specified and limited, the terms "coupled", "connected", "fixed" are to be understood in a broad sense, for example, as a fixed connection, as a removable connection, or as a one-piece unit; as a mechanical connection or as an electrical connection; as a direct connection or as an indirect connection through an intermediate medium; as an internal connection of two components or an interaction of two components. To those skilled in the art, the meaning of the above terms in the context of the present disclosure may be understood in accordance with the circumstances.

Figure 1:
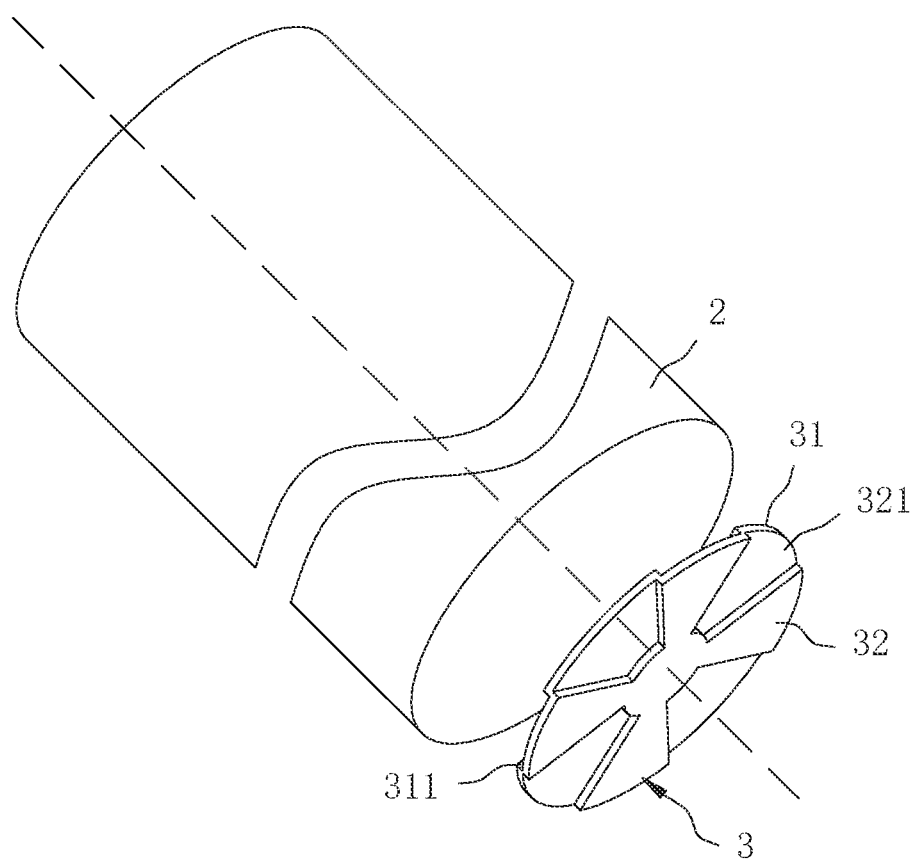
FIG. 1 is an exploded schematic view of a cell and a current collector plate according to an embodiment of the present disclosure.
Figure 2:
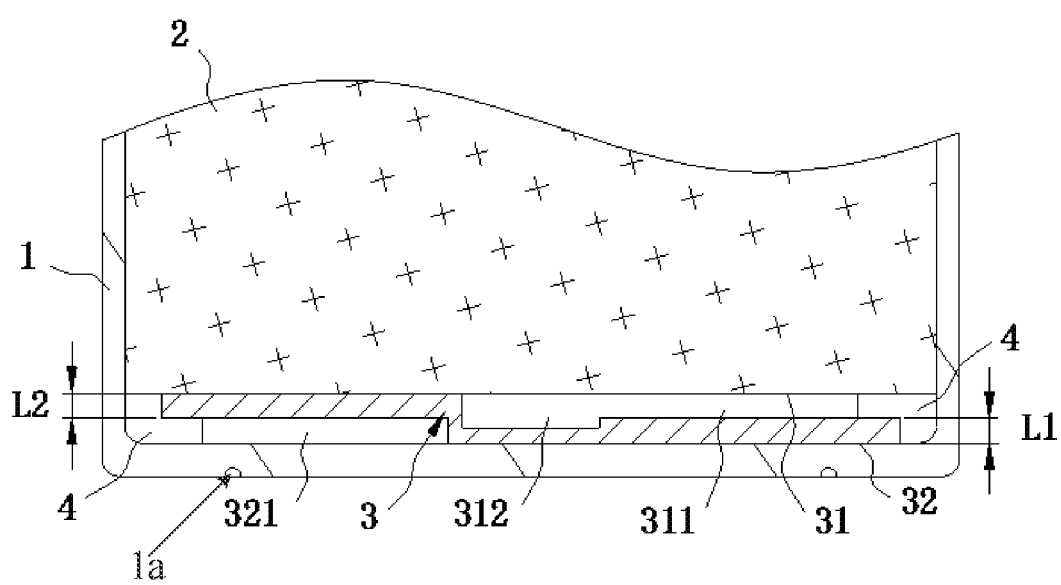
FIG. 2 is a cross-sectional schematic view of a battery according to an embodiment of the present disclosure.
Figure 3:
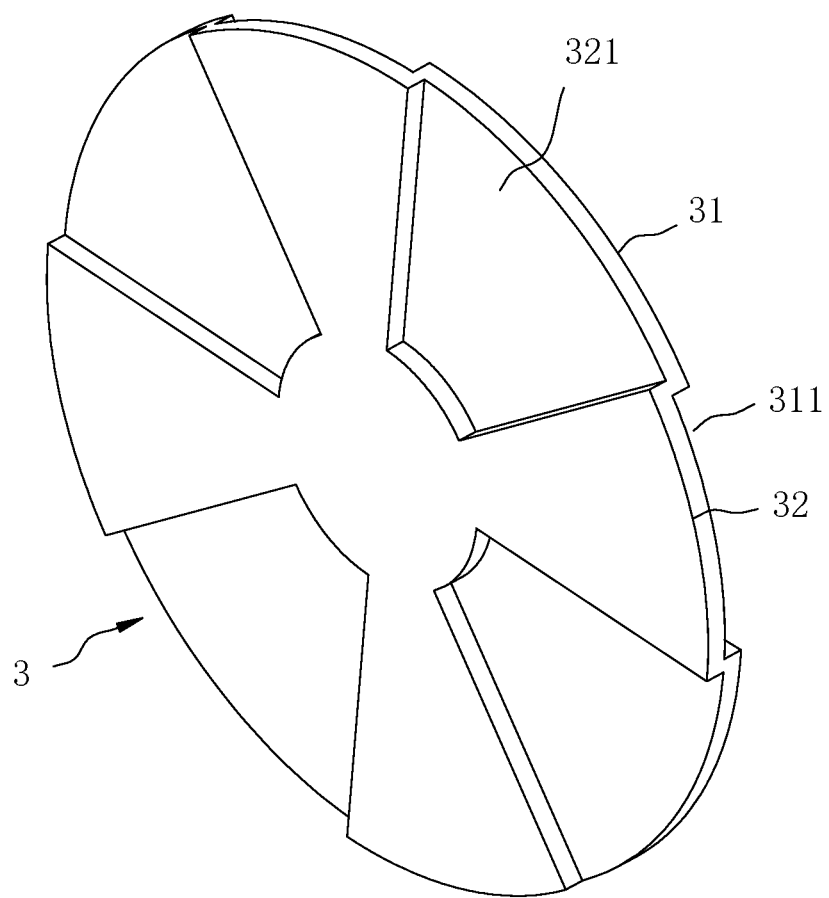
FIG. 3 is a schematic view of a current collector plate according to an embodiment of the present disclosure.

As shown in FIGS. 1 to 3, the present disclosure provides a battery including a housing 1, a cell 2, and a current collector plate 3, a holding chamber is defined in the housing 1, a pressure relief valve 1a (shown in FIG. 2) is arranged on the housing 1, and the cell 2 is arranged in the holding chamber; the current collector plate 3 includes a first side 31 and a second side 32 disposed opposite each other, the first side 31 is connected to an end surface of the cell 2, and the second side 32 is connected to a bottom of the holding chamber; the first side 31 defines a first recess 311, and the first recess 311 is spaced from the end surface of the cell 2; the second side 32 defines a second recess 321, and the pressure relief valve 1a is disposed directly opposite to the second recess 321; an edge of the current collector plate 3 is spaced from a wall of the holding chamber to define a connection channel 4, and the first recess 311 and the second recess 321 are connected through the connection channel 4. By setting the first recess 311, the connection channel 4, and the second recess 321 connected, it may be ensured that the pressure relief valve 1a is connected with the interior of the cell 2, such that the pressure relief valve 1a can sense the change of air pressure in the holding chamber in time and make pressure relief in time; when the cell 2 expands, the first recess 311 can provide a release space for the expansion of the cell 2, and the gas generated inside the cell 2 can flow into the second recess 321 through the first recess 311 and the connection channel 4 and finally reach the pressure relief valve 1a on the housing 1 for pressure relief. The second groove 321 can ensure that the current collector plate 3 and the pressure relief valve 1a are spaced apart to avoid the deformation of the current collector plate 3 blocking the pressure relief valve 1a, thereby avoiding fire and explosion and other safety problems caused by the untimely release of pressure inside the battery, and further ensuring the usage safety of the battery.

Figure 4:
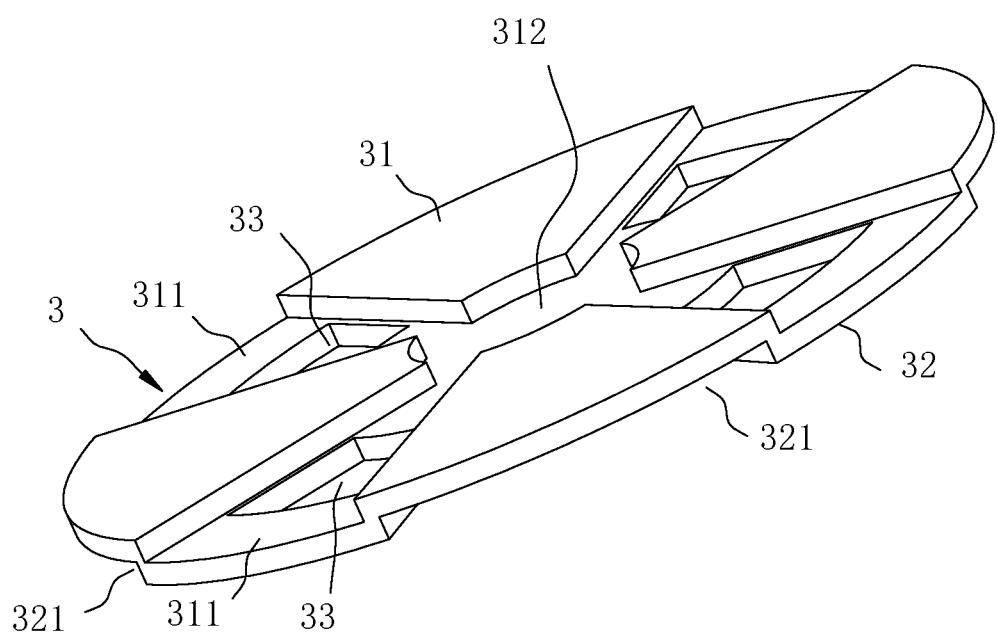
FIG. 4 is a schematic view of a current collector plate according to another embodiment of the present disclosure.

Referring to FIG. 4, a bottom of the first recess 311 defines an immersion hole 33, and the immersion hole 33 runs through the current collector plate 3. If the immersion hole 33 is not set, the electrolyte can only flow into the cell 2 through the connection channel 4. The solution proposed by the present disclosure provides the immersion hole 33 on the current collector plate 3, such that during the liquid injection of the battery, the electrolyte can flow into the cell 2 through the immersion hole 33, which improves the flow speed of the electrolyte, accelerates the electrolyte for immersion of active substances, and shorten the liquid injection time. Compared with the connection channel 4, the immersion hole 33 is closer to the center of the cell 2, and the infiltration hole 33 may make it easier for the electrolyte to immerse the interior of the cell 2.

The number of each of the first recess 311 and the second recess 321 may be more than one, and the multiple first recesses 311 are arranged at intervals around an axis of the current collector plate 3, and each second recess 321 is arranged facing an interval region between two corresponding adjacent first recesses 311. By providing the multiple first recesses 311 and second recesses 321, multiple concave-convex structures can be formed on the current collector plate 3, which may increase the strength of the current collector plate 3 and reduce the deformation of the current collector plate 3. By arranging the second recesses 321 facing the interval region between two adjacent first recesses 311, the overall thickness of the current collector plate 3 can be thinned, which is conducive to reducing the volume and weight of the battery and improving the energy density of the battery. In some embodiments, the current collector plate 3 is processed and formed by stamping.

Referring to FIGS. 2 and 3, in some embodiments, a central region of the first side 31 defines a third recess 312, a bottom of the third recess 312 is spaced from the end surface of the cell 2, and all the first recesses 311 are connected to the third recess 312. By providing the third recess 312, the third recess 312 can connect all the first recesses 311, such that when the cell 2 expands, the gas can flow out from any of the first recesses 311 to avoid the gas congestion in any first recess 311 causing excessive local pressure. That is, the third recess 312 may facilitate the exhaust of the cell 2 to release the pressure. In the embodiments, the third recess 312 may be circular in shape.

The first recess 311 has a fan ring shape, and the second recess 321 also has a fan ring shape. By arranging the first recess 311 and the second recess 321 having the fan ring shape, the shape of the first recess 311 and the second recess 321 can be adapted to the shape of the current collector plate 3 itself for easy processing. The edges of the first recess 311 and the second recess 321 may be aligned with the radial direction of the collector plate 3, which is conducive to enhancing the strength of the current collector plate 3.

In some embodiments, the cross-section of the immersion hole 33 has the same shape as the cross-section of the first recess 311. By arranging the cross-section of the immersion hole 33 to be the same shape as the cross-section of the first recess 311, the size of the immersion hole 33 can be increased as much as possible and the efficiency of liquid injection can be improved. Both the immersion hole 33 and the first recess 311 may have a fan ring shape. It can be understood that a fan ring is a remaining shape of a large fan minus a small fan concentric to the large fan.

The first recess 311 and the second recess 321 may have the same size. By arranging the first recess 311 and the second recess 321 with the same size, the first recess 311 and the second recess 321 may be evenly distributed on the current collector plate 3, such that the concave-convex structures on the current collector plate 3 may be evenly distributed for improving the strength of multiple places on the current collector plate 3.

In the embodiments, referring to FIG. 2, the distance between the bottom of the first recess 311 and the second side 32 is L1, the distance between the bottom of the second recess 321 and the first side 31 is L2, and L1=L2. By setting the distance between the bottom of the first recess 311 and the second side 32 equal to the distance between the bottom of the second recess 321 and the first side 31, the thickness of the current collector plate 3 may be made as uniform as possible in many places to reduce the deformation of the collector plate 3.

The end surface of the cell 2 near the current collector plate 3 is flat. In the embodiments, the end surface of the cell 2 and the first recess 311 of the current collector plate 3 are spaced apart, and the spacing region between the end surface of the cell 2 and the first recess 311 is connected to the pressure relief valve on the housing 1 through the connection channel 4 and the second groove 321, and the end surface of the cell 2 near the current collector plate 3 is flat, which may ensure the area of the spacing region between the cell 2 and the current collector plate 3. In this way, when the cell 2 expands, there is enough space in the first recess 311 to absorb the expansion of the cell 2 and balance the air pressure in the holding chamber through the pressure relief valve, thereby ensuring the safety performance of the battery.

Embodiments of the present disclosure further provides a battery module, including the battery in any of the above embodiments. In the process of use, the pressure relief valve on the housing 1 can timely release the pressure generated by the expansion of the cell 2, such that the battery is not prone to explosion and other safety problems. Therefore, the battery module including this battery has a high safety factor and good quality.

In the description herein, the terms "up", "down", "left", "right", and other orientation or positional relationships are based on the orientation or positional relationships shown in the accompanying drawings and are intended only to facilitate description and simplify operation, not to indicate or imply that the device or element referred to must have a particular orientation, be constructed and operate in a particular orientation, and therefore are not to be construed as limiting the present disclosure. In addition, the terms "first" and "second" are used only for descriptive distinction and have no special meaning.

In the description of this specification, reference to the description of the term "embodiment", "example", etc. means that the features, structures, materials, or characteristics described in connection with the embodiment or example are included in at least one embodiment or example of the present disclosure. In this specification, the schematic representation of the above terms does not necessarily refer to the same embodiment or example.

In addition, although this specification is described in accordance with the embodiments, but not each embodiment contains only a separate technical solution, and the specification of this narrative only for clarity. Those skilled in the art should take the specification as a whole, and technical solutions in the multiple embodiments can also be appropriately combined to form other embodiments that can be understood by those skilled in the art.

What is claimed is:

1. A battery, comprising:
a housing, wherein a holding chamber is defined in the housing and a pressure relief valve is arranged on the housing;
a cell, arranged in the holding chamber; and
a current collector plate, comprising a first side and a second side disposed opposite each other; wherein the first side has a first surface abutting against an end surface of the cell, and the second side has a second surface abutting against a bottom wall of the holding chamber; the first surface of the first side is recessed to define a first recess, and the first recess is spaced from the end surface of the cell; the second surface of the second side is recessed to define a second recess; a circumferential edge of the current collector plate is spaced from a wall of the holding chamber to define a connection channel, the connection channel extends along a circumferential direction of the current collector plate and surrounds the circumferential edge of the current collector plate, and the first recess is communicated with the connection channel at the circumferential edge of the current collector plate, and the connection channel is communicated with the second recess at the circumferential edge of the current collector plate, and the first recess is communicated with the second recess through the connection channel.

2. The battery according to claim 1, wherein the bottom of the first recess defines an immersion hole, and the immersion hole runs through the current collector plate.

3. The battery according to claim 2, wherein a cross-section of the immersion hole has the same shape as a cross-section of the first recess.

4. The battery according to claim 1, wherein the first recess comprises a plurality of first recesses, the second recess comprises a plurality of second recesses; the plurality of first recesses are arranged at intervals around an axis of the current collector plate, and each second recess is arranged facing an interval region between two corresponding adjacent first recesses.

5. The battery according to claim 4, wherein a central region of the first side defines a third recess, a bottom of the third recess is spaced from the end surface of the cell, and the plurality of first recesses are connected to the third recess.

6. The battery according to claim 4, wherein the current collector plate is in a shape of a circular plate, each first recess and each second recess is located at a section of the circular current collector plate, a cross-sectional area of the first recess and the second recess is increased in a direction from a center of the circular current collector plate towards an edge of the circular current collector plate.

7. The battery according to claim 4, wherein each first recess and each second recess have the same size.

8. The battery according to claim 1, wherein the end surface of the cell facing towards the current collector plate is flat.

9. The battery according to claim 1, wherein a distance between the bottom of the first recess and the second side is L1, a distance between a bottom of the second recess and the first side is L2, and L1=L2.

10. A battery module, comprising a battery;
wherein the battery comprises:
a housing, wherein a holding chamber is defined in the housing and a pressure relief valve is arranged on the housing;
a cell, arranged in the holding chamber; and
a current collector plate, comprising a first side and a second side disposed opposite each other; wherein the first side is connected to an end surface of the cell, and the second side is connected to a bottom of the holding chamber; the first side defines a first recess, and the first recess is spaced from the end surface of the cell; the second side defines a second recess, and the pressure relief valve is disposed directly opposite to the second recess; an edge of the current collector plate is spaced from a wall of the holding chamber to define a connection channel, and the first recess and the second recess are connected through the connection channel;
wherein a distance between the bottom of the first recess and the second side is L1, a distance between a bottom of the second recess and the first side is L2, and L1=L2; and an entirety of the current collector plate has a substantially uniform thickness to reduce deformation of a configuration of the current collector plate.

11. The battery module according to claim 10, wherein the bottom of the first recess defines an immersion hole, and the immersion hole runs through the current collector plate.

12. The battery module according to claim 11, wherein a cross-section of the immersion hole has the same shape as a cross-section of the first recess.

13. The battery module according to claim 10, wherein the first recess comprises a plurality of first recesses, the second recess comprises a plurality of second recesses; the plurality of first recesses are arranged at intervals around an axis of the current collector plate, and each second recess is arranged facing an interval region between two corresponding adjacent first recesses.

14. The battery module according to claim 13, wherein a central region of the first side defines a third recess, a bottom of the third recess is spaced from the end surface of the cell, and the plurality of first recesses are connected to the third recess.

15. The battery module according to claim 13, wherein the current collector plate is in a shape of a circular plate, each first recess and each second recess is located at a section of the circular current collector plate, a cross-sectional area of the first recess and the second recess is increased in a direction from a center of the circular current collector plate towards an edge of the circular current collector plate.

16. The battery module according to claim 13, wherein each first recess and each second recess have the same size.

17. The battery module according to claim 10, wherein the end surface of the cell facing towards the current collector plate is flat.

\* \* \* \* \*